Oct. 5, 1965  W. BUNKER  3,209,853
VEHICLE ROAD SPEED CONTROL
Original Filed June 11, 1957  6 Sheets-Sheet 2

INVENTOR.
Ward Bunker
BY
ATTORNEY.

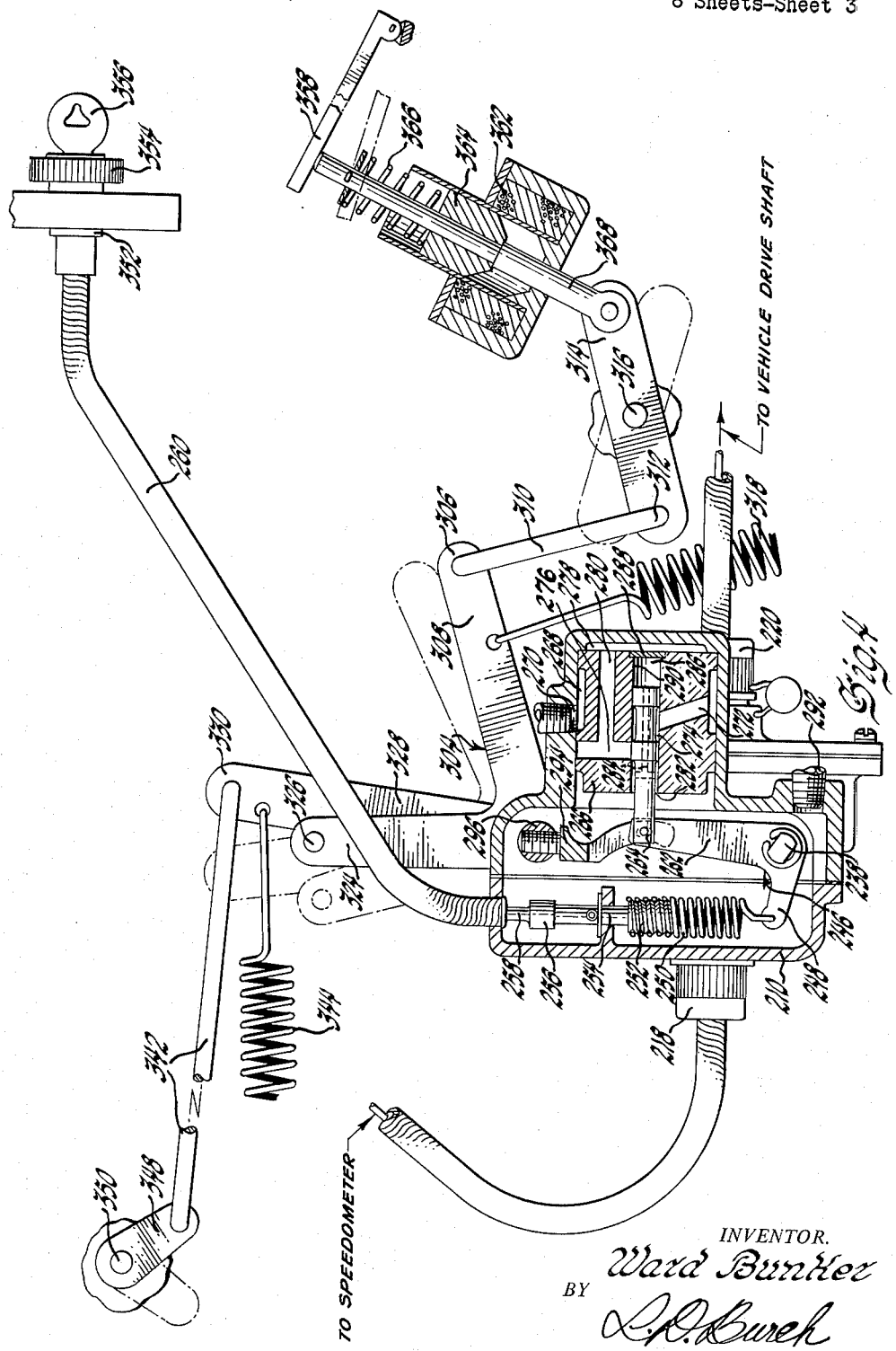

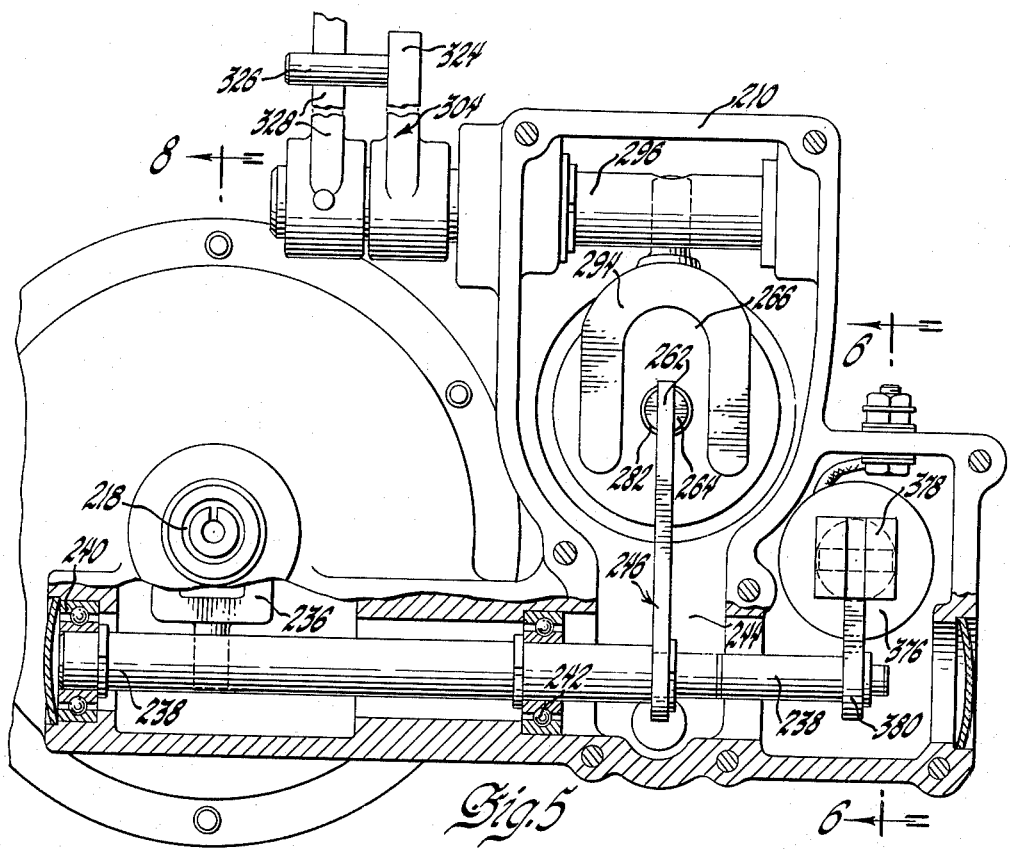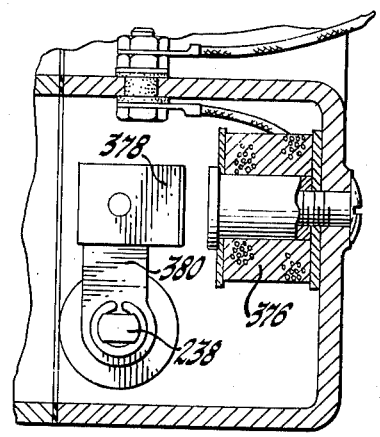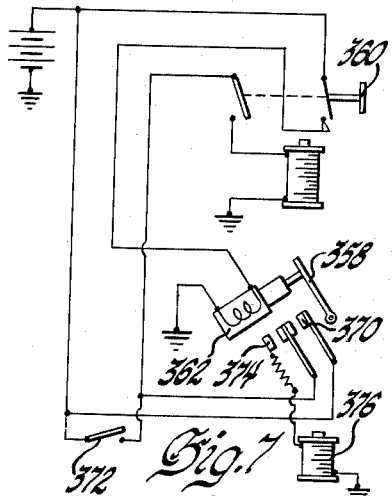

INVENTOR.
Ward Bunker
BY
ATTORNEY.

INVENTOR.
*Ward Bunker*

*L. D. Burch*
ATTORNEY

United States Patent Office 3,209,853
Patented Oct. 5, 1965

3,209,853
VEHICLE ROAD SPEED CONTROL
Ward Bunker, Dayton, Ohio, assignor to General Motors Corporation, Detroit, Mich., a corporation of Delaware
Continuation of abandoned application Ser. No. 665,091, June 11, 1957. This application Mar. 8, 1962, Ser. No. 179,289
7 Claims. (Cl. 180—82.1)

This application is a continuation of my abandoned application Serial No. 665,091, entitled Vehicle Road Speed Control, and filed June 11, 1957.

The invention relates to a system for controlling the road speed of an automotive vehicle. Features of the invention include control of the power delivered by an engine in a vehicle as a function of vehicle speed. The system permits limitation of maximum vehicle speed with no limit on the deliverable power of the vehicle engine when the vehicle is below the maximum predetermined speed. The system also permits control of the vehicle to maintain the vehicle road speed at a constant predetermined value by automatically adjusting the engine power variations required to maintain the speed. The system provides constant operator control so that the maximum speed allowed or the constant or cruise speed being maintained may be immediately overcome when considered necessary by the vehicle operator.

Previous vehicle speed control systems operating on the control of engine speed have partially denied the use of maximum engine power at speeds below the desired maximum, resulting in decreased vehicle performance below this speed. Previous systems have also been deficient in that they did not permit instantaneous removal of the maximum speed control condition under the direct control of the operator when such removal may be required. The previous systems providing a constant cruise speed control did not adequately provide for immediate control release when the operator felt it necessary to slow the vehicle or accelerate it because of hazardous driving conditions. The system now proposed includes mechanisms for controlling the road speed of a vehicle which overcome these objections and provide a simple control which is always subject to the demands of the vehicle operator.

In the drawing:

FIGURE 4 is a modification of the control system of FIGURE 1;

FIGURE 5 is an enlarged view of a portion of the control system of FIGURE 4 with parts broken away and in section;

FIGURE 6 is a view taken in the direction of arrows 6—6 of FIGURE 5 with parts broken away and in section;

FIGURE 7 is a schematic diagram of an electrical control circuit for the system;

Figure 1:
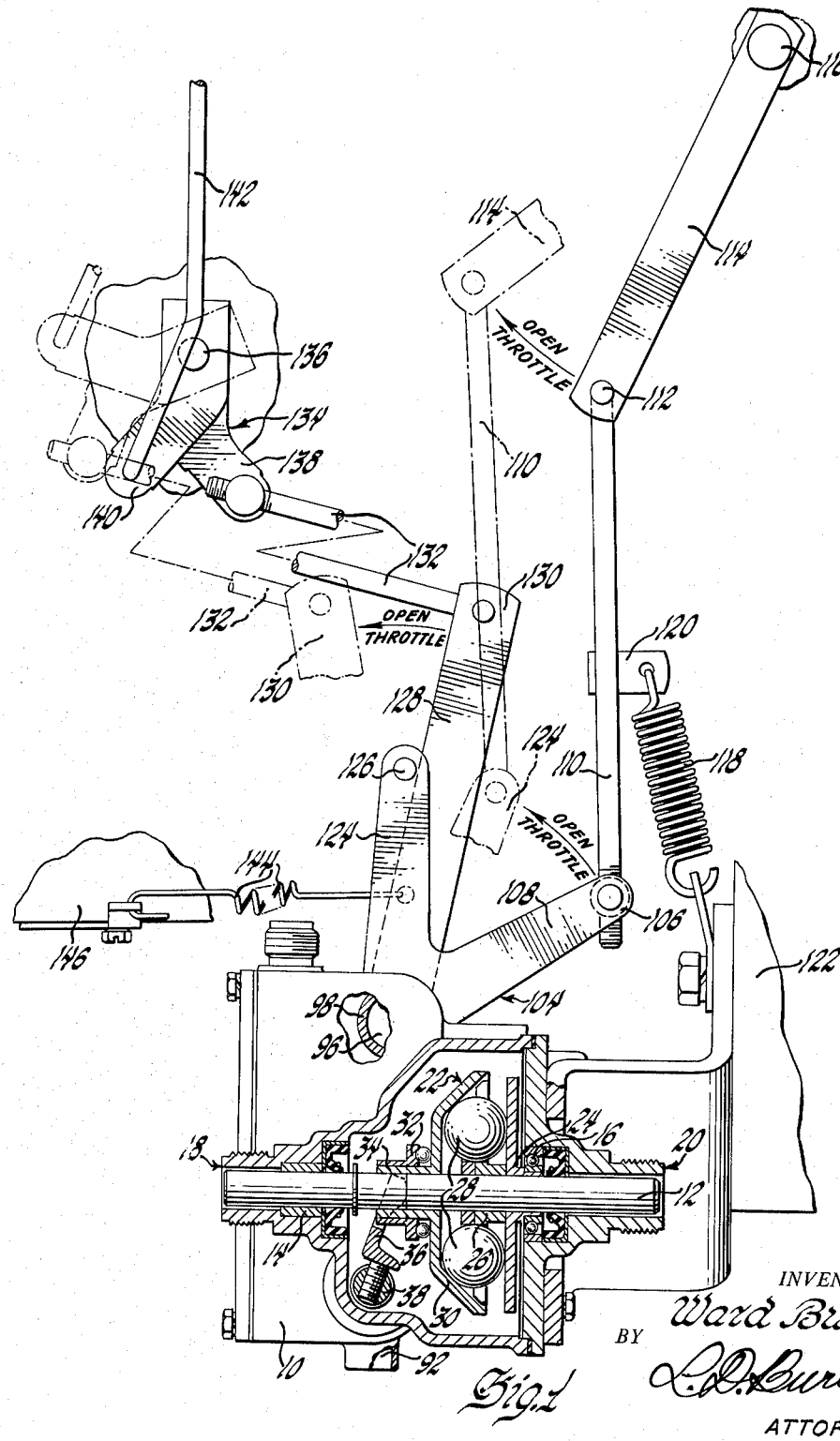
FIGURE 1 illustrates a road speed control system embodying the invention and includes a cross section view taken in the direction of arrows 1—1 of FIGURE 2.
Figure 2:
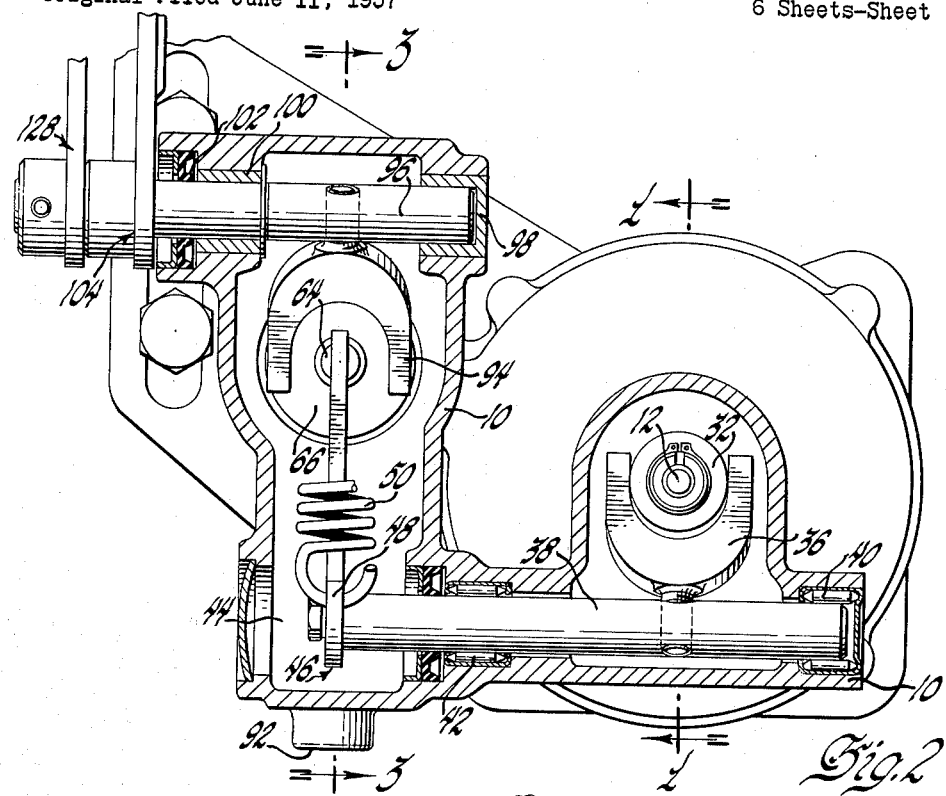
FIGURE 2 illustrates a portion of the road speed control system of FIGURE 1 with parts broken away and in section.
Figure 3:
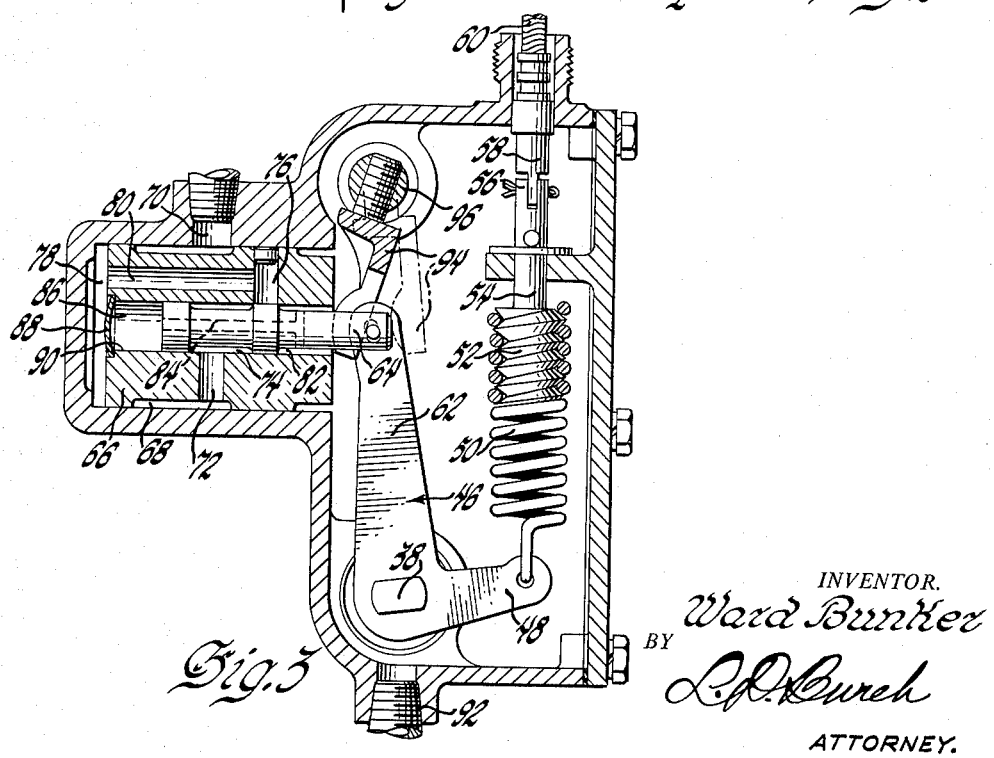
FIGURE 3 is a cross section view taken in the direction of arrows 3—3 of FIGURE 2.
Figure 8:
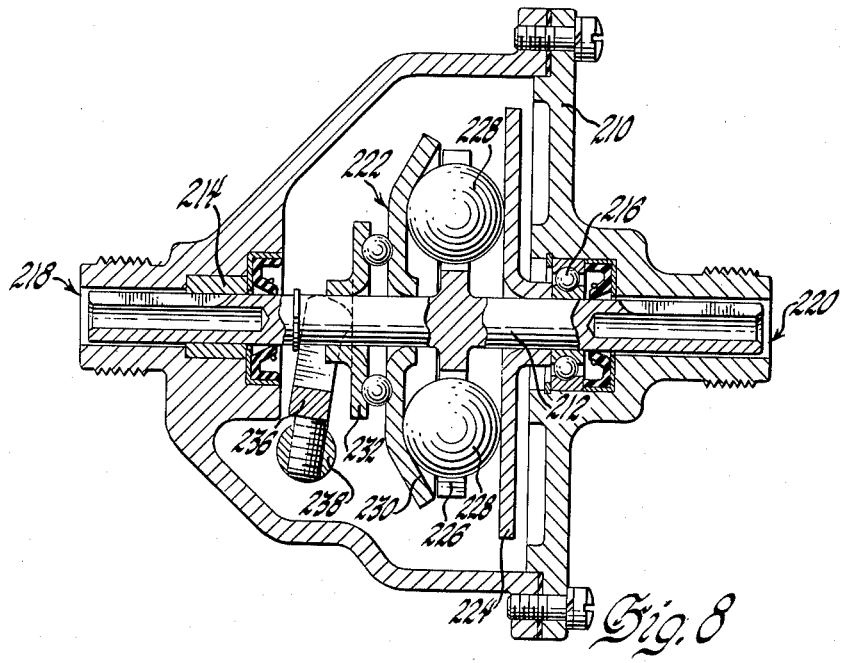
FIGURE 8 is a cross section view taken in the direction of arrows 8—8 of FIGURE 5.

The road speed control system shown in FIGURES 1 through 3 includes a control casing 10 through which a shaft 12 projects. Shaft 12 is rotatably mounted in bearings 14 and 16. Each end of the shaft 12 and the adjacent portions of the casing 10 are formed to provide flexible drive coupling means 18 and 20 for the attachment of flexible drive shafts which may be of any well known construction. The coupling means 18 is connected to a flexible drive shaft leading to the vehicle speedometer. The flexible drive coupling means 20 is connected to a flexible drive shaft leading from the speedometer drive adapted coupling of the vehicle transmission to the shaft 12. The vehicle speedometer is therefore driven from the output shaft of the vehicle transmission through shaft 12.

Shaft 12 projects through a chamber in casing 10 in which a flyball governor mechanism 22 is received. This governor mechanism reflects vehicle speed and includes a floating governor disk 24 and a drive spider 26 mounted on the shaft 12 so as to receive governor balls 28 within the openings provided by the spider. A governor cup 30 is provided and formed to restrict the outward movement of the balls 28 within the spider and is slidably movable along shaft 12 by the outward movement of the balls resulting from centrifugal forces exerted when shaft 12 is rotated.

A sleeve bearing 32 is rotatably mounted on the sleeve mounting hub 34 which may be integrally formed with cup 30. Bearing 32 is engageable with a yoke 36 which projects radially from an intermediate segment of a transversely disposed shaft 38. Shaft 38 has its opposite ends mounted in casing 10 in roller bearings 40 and 42 as is best shown in FIGURE 2.

One end of shaft 38 projects through bearing 42 and into chamber 44 of casing 10 and has a bell crank lever 46 rigidly secured thereto. Arm 48 of lever 46 engages one end of a variable force exerting spring 50, the opposite end of which receives the threaded end 52 of adjusting stud 54. This arrangement is best shown in FIGURE 3. The pitch of threads formed on threaded end 52 is equal to the pitch of spring 50 so that rotation of stud 54 will tighten or loosen the spring tension as desired to reflect a reference speed. Stud 54 is connected through a coupling 56 to one end 58 of a flexible shaft 60. The governor mechanism and the assembly of which spring 50 is a part and the linkage associated therewith cooperate to provide vehicle speed error sensing means.

The other end of shaft 60 may terminate in a dial on the instrument panel or steering column of the motor vehicle in which the system is employed. The dial may be set to indicate the speed to which the vehicle is to be limited or the speed at which the vehicle is to be maintained as well as limited.

The other arm 62 of lever 46 is connected to the end of a control valve 64 which acts as a pilot valve for the power piston 66. Movement of arm 62 reflects vehicle speed error in which the valve responds. Piston 66 may be provided with an annular passage 68 formed as a groove between lands on the piston. Passage 68 is adapted to communicate at all times with inlet port 70 in casing 10. Port 70 is connected to the oil pump of the vehicle engine or some other source of fluid under pressure. Passage 68 is also connected to a radial passage 72 formed in piston 66. The inner end of radial passage 72 communicates with an annular port 74 formed as a groove between a pair of lands on control valve 64. A second radial passage 76 is provided in piston 66 which is spaced axially from radial passage 72 and operatively communicates with the chamber 78 formed by the end of piston 66 and a portion of casing 10. Axially disposed passage 80 provides fluid communication between radial passage 76 and chamber 78.

When control valve 64 moves outwardly of power piston 66, the annular port 74 will communicate with the radial passage 76 and the axially disposed passage 80 will supply fluid under pressure to chamber 78. This pressure will act on the end of piston 66 to move that piston outwardly as control valve 64 moves outwardly. Control valve 64 is provided with a second annular port 82 which is adjacent the outer end of the valve and will connect port 76 to exhaust when piston 66 moves outwardly beyond the place where it cuts off fluid communication between annular port 74 and radial passage 76. The port 82 also communicates with an axial passage 84. This passage is formed in control valve 64 and terminates in the chamber 86 formed by the inner end of valve 64 and the plug 88 which closes the end of the control valve passage 90 in piston 66. Passage 84 maintains the chamber 86 at exhaust pressure at all times so that valve 64 may be easily moved without fluid pressure resistance. Port 82 is always in communication with the interior of casing 10. A drain port 92 may be positioned in the lower portion of casing 10 and permits the return to the fluid source of all fluid exhausted through port 82.

When power piston 66 moves outwardly with control valve 64, the outer end of piston 66 may engage yoke 94, the ends of which are disposed on opposite sides of the outer end of control valve 64. Yoke 94 extends radially from and is secured to a shaft 96 which is disposed in casing 10. Shaft 96 is parallel to shaft 38 and is mounted in bearings 98 and 100.

Shaft 96 may project exteriorly through a wall of casing 10 through bearing 100 and a seal 102. Bell crank lever 104 is a driver operated input means portion of the throttle valve actuating linkage and may be rotatably mounted on the outer end of shaft 96. One end 106 of arm 108 may be pivotally secured to one end of rod 110. The other end 112 of rod 110 may be secured to an arm 114 which may be rotated about the axis of shaft 116 by opening and closing movement of the vehicle accelerator pedal by the vehicle driver. A spring 118 may be secured to a lug 120 attached to an intermediate portion of rod 110 and to the vehicle frame at 122. Spring 118 opposes movement of the vehicle accelerator pedal toward the open throttle position.

Arm 124 of lever 104 is provided with a laterally extending pin 126 which projects into the path of movement of arm 128. Arm 128 is another input means portion of the throttle valve actuating linkage and is secured to the outer end of shaft 96 beyond lever 104. The outer end 130 of arm 128 may be connected by rod 132 to another bell crank lever 134 which may be pivotally mounted to a portion of the engine frame 136. Lever 134 is provided with an arm 138 which is connected to rod 132 and with another arm 140 which is connected by rod 142 to provide throttle linkage output means to the engine throttle. A spring 144 extending between an opening in the arm 128 and a stationary part 146 of the vehicle tends to hold arm 128 against pin 126 which projects from arm 124 of lever 104.

FIGURE 1 shows the levers 104 and 134 and arm 128 in solid lines to illustrate idle position of the engine throttle when the vehicle is not in motion. As seen in FIGURE 3, yoke 94 would be at the position shown in dashed lines under these conditions. This yoke is moved away from the piston to this position by the idle return spring 118, permitting the engine to idle with the governor weights closed. This position of yoke 94 is also obtained with the governor weights fully opened. It is also seen in these figures that the mechanism in casing 10, and especially power piston 66, may be connected with the throttle so that it is in series with the throttle linkage section including rod 132 and may act on that linkage section in parallel with the linkage section having arm 114 and rod 110 as parts thereof.

To accelerate the vehicle from a standing start, the operator depresses the accelerator pedal to any desired extent. This movement acts through arm 114 and rod 110 to rotate bell crank lever 104 counterclockwise as viewed in FIGURE 1 and will tend to move pin 126 away from arm 128. As previously noted and shown in FIGURE 3, yoke 94 is at that time in the position shown in dashed lines. When the lever 104 is rotated by operation of the accelerator pedal, yoke 94 will move from the dash line position of FIGURE 3 toward the position shown in full lines in that figure. Spring 144 will move arm 128 with pin 126 and is permitted to open the throttle to an open position corresponding to the position of the accelerator pedal. This movement is transmitted from arm 128 to the engine throttle through rod 132, lever 134, and throttle rod 142. The power piston 66 and the control valve 64 will remain in the position shown in FIGURE 3 because spring 50 tends to hold control valve 64 in its innermost position until the speed of the vehicle increases to the preset maximum vehicle speed. When the speed of the vehicle reaches the maximum preset speed, the centrifugal forces resulting from rotation of the balls 28 will move yoke 36 and rotate shaft 38. Lever 46, in turn, will be rotated and control valve 64 will be moved to the right as shown in FIGURE 3. Annular port 74 will then open to supply fluid under pressure from port 70 through annular passage 68 and radial passage 72 to radial passage 76 and axially disposed passage 80, thereby causing power piston 66 to move and follow control valve 64 in the manner graphically shown in FIGURES 11 or 12. When power piston 66 moves far enough to the right relative to control valve 64 to close port 74 from port 76 and passage 80, further movement of power piston 66 will cease. This results because the pressure on the end of piston 66 in chamber 78 will be relieved by communication between passages 76 and 80 and exhaust port 82 to the extent that the pressure on chamber 78 balances the force of spring 144. As power piston 66 moves outwardly to the right as shown in FIGURE 3, it will rotate yoke 94 in a counterclockwise direction, thereby moving lever 128 against the force of spring 144 and clockwise away from pin 126 as seen in FIGURE 1. This movement of arm 128 closes the engine throttle by operation of rod 132, lever 134 and rod 142. The operator can always idle the engine with the accelerator pedal since pin 126 will engage lever 128 and return it to the closed throttle position. The force necessary to accomplish this is applied by spring 118, which is stronger than spring 144. The operator can only open the throttle as far as the governor will permit, however. The force required to push the accelerator pedal toward the open throttle position is the difference between the forces exerted by springs 118 and 144. When lever 128 moves away from pin 126 the force exerted against the accelerator pedal is the force of spring 118. Therefore, when the vehicle reaches the selected speed, more force is required to hold the accelerator down while the governor is controlling. As the vehicle speed falls below the governed speed, the balls 28 will move inwardly to a slight extent, thereby rotating yoke 36 in a clockwise direction as seen in FIGURE 1 and rotating arm 62 in a counterclockwise direction as seen in FIGURE 3 to move control valve 64 into power piston 66. Exhaust port 82 is thus opened to passages 76 and 80, allowing fluid in chamber 78 to escape from the piston to exhaust. Escape of fluid from chamber 78 does not move piston 66, however. The force that moves piston 66 is that exerted by spring 144 as it moves arms 128 against pin 126 to rotate yoke 94 in a clockwise direction as seen in FIGURE 3. The force of spring 144 will therefore move power piston 66 inwardly until the exhaust port 82 is cut off from passage 76 by control valve 64.

It is thus apparent that power piston 66 follows control valve 64 outwardly in response to changes in pressure in chamber 78 which may be said to reflect or be proportional to vehicle speed error. Subject to such pressures, piston 66 follows valve 64 inwardly in response to force exerted by spring 144. If the foot of the operator is removed from the accelerator pedal at any time, spring 118 will rotate bell crank lever 104 in a clockwise direction as seen in FIGURE 1 and pin 126 will therefore move arm 128 in a clockwise direction against the force of spring 144. This movement will rotate yoke 94 away from piston 66 and into the dash line position shown in FIGURE 3. In order to accomplish this, spring 118 will of course have to be stronger than spring 144.

The modification shown in FIGURES 4 through 8 has a control casing 210 with a shaft 212 mounted in bearings 214 and 216 and is provided with flexible drive couplings 218 and 220. A flexible drive shaft may be connected to coupling 220 between the vehicle drive shaft and shaft 212. A flexible drive shaft may be connected between coupling 218 and the vehicle speedometer.

Casing 210 contains a flyball governor mechanism 222 which includes a governor disk 224, a spider 226, and governor balls 228. A governor cup 230 may be slidably mounted on shaft 212 and a sleeve bearing 232 may be in rotatable engagement with the cup. Bearing 232 is engageable with a yoke 236 which projects radially from an intermediate portion of transverse shaft 238. Shaft 238 is rotatably mounted in bearings 240 and 242 which are in turn secured with casing 210.

Shaft 238 extends into chamber 244 of casing 210 and has a bell crank lever 246 non-rotatably secured thereon. Arm 248 of lever 246 engages one end of spring 250. The other end of spring 250 receives the threaded portion 252 of adjusting stud 254. This stud is connected through coupling 256 to one end 258 of a flexible shaft 260.

Arm 262 of lever 246 is connected to the end of control valve 264 which acts as the pilot valve for power piston 266. The power piston is provided with an annular passage 268 which is adapted to communicate with inlet port 270 in casing 210. Port 270 may receive fluid under pressure from any suitable source such as the oil pump of the vehicle engine. Passage 268 is also connected to radial passage 272 which is formed in piston 266. Radial passage 272 in turn communicates with annular port 274 formed by control valve 264. A radial passage 276 is provided in power piston 266 and is axially spaced from radial passage 272. Passage 276 operatively communicates with chamber 278 formed by the end of piston 266 and a portion of casing 210. An axially disposed passage 280 provides communication between passage 276 and chamber 278.

When control valve 264 moves out of power piston 266, annular port 274 will open to radial passage 276 and passage 280 will supply fluid under pressure to chamber 278, moving piston 266 outwardly as control valve 264 is moved outwardly. Annular port 282 of control valve 264 will then connect port 276 to exhaust when power piston 266 moves outwardly beyond the point where fluid communication is interrupted between annular port 274 and radial passage 276. Port 282 also communicates with axial passage 284 in control valve 264. Passage 284 terminates at chamber 286. This chamber is formed by the inner end of valve 264 and plug 288 which closes the end of control valve passage 290 in piston 266. Passage 284 keeps chamber 286 at exhaust pressure at all times so that valve 264 may be readily moved in either direction without resistance. Port 282 is always connected with the interior of casing 210 and a drain port 292 may be located in the lower portion of the casing to return exhaust fluid to the fluid source.

As power piston 266 moves outwardly with control valve 264, it engages yoke 294 which is disposed on either side of the outer end of control valve 264. Yoke 294 extends radially from and is secured to shaft 296 which is disposed in casing 210. Shaft 296 extends exteriorly of casing 210 and has a bell crank lever 304 rotatably mounted thereon near its outer end. End 306 of an arm 308 may be pivotally secured to one end of a rod 310. The other end 312 of rod 310 may be secured to a pivot arm 314 which is rotatable about shaft 316, when the vehicle accelerator pedal is moved between the open and closed throttle positions. A spring 318 may be attached to arm 308 and to the vehicle frame to oppose movement of the vehicle accelerator pedal toward the open throttle position.

Arm 324 of lever 304 may be provided with a laterally extending pin 326 which projects into the path of movement of arm 328. This arm is rigidly secured to the outer end of shaft 296 beyond lever 304. The outer end 330 of arm 328 is connected by rod 342 to throttle arm 348 to actuate throttle shaft 350. Arm 328 has a spring 344 extending between the arm and a stationary part of the vehicle. This spring tends to hold arm 328 against pin 326. Inspection of FIGURES 4 and 5 will show that the mechanism and casing 210, and particularly power piston 226, may be connected with the throttle so that it is in series with rod 342 and may act in parallel to the accelerator linkage elements such as shaft 368, arm 314 and rod 310.

The general operation of the modified mechanism so far described is similar to the mechanism described and shown in FIGURES 1 through 3. It is possible to lock the modified mechanism in a pre-selected vehicle speed position by employing a lock and key mechanism in the barrel 352 of the selector 354. Key 356 may be used by locking the selector 354 in any position at which it may be set.

It is also possible to lock the accelerator pedal 358 at approximately three-fourths open throttle position and permit the vehicle to run at the selected maximum speed, thereby establishing a constant vehicle cruise speed. This may be accomplished by closing button switch 360 on the instrument panel or other convenient location which closes a circuit energizing solenoid or electromagnet 362. When solenoid 362 is energized and core 364 is moved manually inwardly of the solenoid, the accelerator pedal 358 will be held in the three-fourths throttle position. Solenoid 362 is not strong enough to move core 364 alone. The manual actuation requirement prevents locking of the control in automatic cruise until the operator desires that it be done. The vehicle thereafter will be driven at any speed at which the selector 354 is set. If the operator of the vehicle desires to release the accelerator pedal, he may do so merely by moving the accelerator pedal slightly beyond the three-fourths throttle position or by moving the brake pedal. If the accelerator pedal 358 is pressed downwardly, spring 366 will be compressed against solenoid core 364, thereby moving shaft 368 through the solenoid core. When this is done, an electrical contact is made through switch 370 which will open the electrical circuit controlling the solenoid 362 and the accelerator pedal will be released from the solenoid-held three-fourths throttle position. Thus switch 370 is selectively operated by movement of the throttle valve actuating linkage beyond the speed maintaining throttle opening position determined by the system.

The accelerator pedal 358 may also be released from the effects of solenoid 362 by applying the vehicle brakes through the brake pedal. When the brake pedal is actuated, normally open switch 372 is closed and a circuit is energized by that switch to de-energize solenoid 362. Switch 372 may be combined with the standard brake light switch or may be a separate switch, so long as it is selectively operable in response to application of the vehicle brakes.

If it is desired to override the maximum control speed temporarily, as when passing another vehicle, a thermo switch 374 may be employed. This switch will be closed when the accelerator is depressed and the vehicle is operating at the maximum permitted speed. A circuit will be closed by the switch 374 which energizes governor override electromagnet or solenoid 376. This electromagnet may be positioned in casing 210 in such a manner as to attract armature 378 which is mounted on arm 380. Arm 380 is preferably rigidly attached to shaft 238. Arm 380 will move shaft 238 to release the tension on spring 250 and move lever 246 clockwise as is shown in FIGURE 4. Control valve 264 is operated to permit inward movement of power piston 266 so that yoke 294 can be moved to any desired position. With the control valve in the inward position, chamber 278 is opened to exhaust and yoke 294 need not overcome any pressure against the power piston to move it to the inward position also. The engine throttle is then allowed to be opened to the wide open position without restriction. When thermo switch 374 becomes sufficiently hot, it will open the circuit energizing override electromagnet 376 and allow the control mechanism to operate normally. Should no maximum period be desired for this override feature, a standard switch may be substituted for thermo switch 374 which will remain closed as long as the accelerator is held in the beyond full throttle position.

Figure 9:
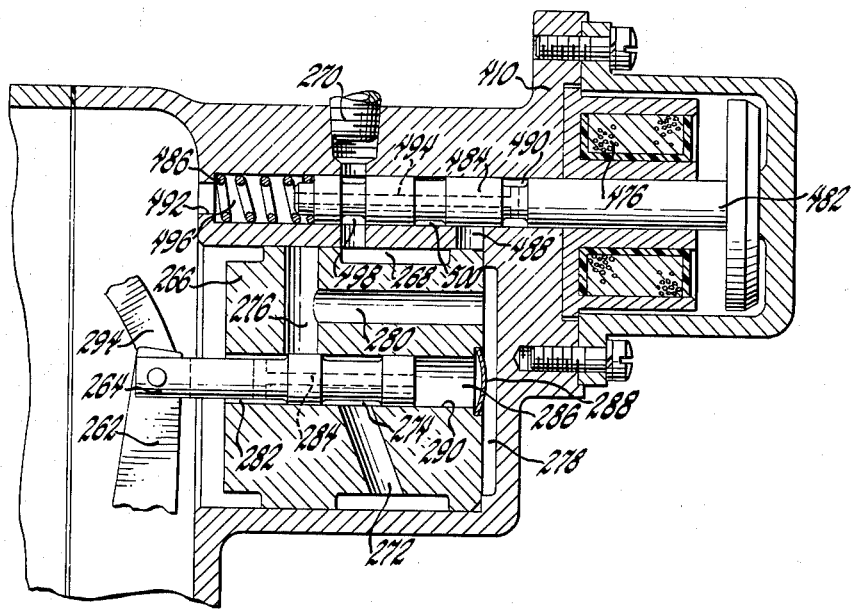
FIGURE 9 is a partial sectional view of a portion of the control system of FIGURE 4 and illustrating a further modification of the system.

The modified control structure shown in FIGURE 9 incorporates the control override feature as a part of the hydraulic system and includes override power actuated means here provided as solenoid 476 which is housed in casing 410. Solenoid or electromagnet 476 is provided with a core 482 which may be axially moved under influence of the solenoid magnetic field. Control piston 484 is secured to core 482 to reciprocate with the core under influence of the solenoid. Piston 484 is received within a control passage 496 formed in the control casing and is positioned axially parallel to and adjacent power piston 266. A control piston return spring 486 is provided in one end of the control passage 496. Laterally extending port 488 connects chamber 278 with the control passage 496. Piston 484 is provided with annular ports 490, 498, and 500 and axially disposed passage 494, which extends from annular port 490 to the end of piston 484 adjacent spring 486. Passage 496 is provided with an exhaust port 492 connecting the passage with the interior of the control casing. The electrical circuit shown in FIGURE 7 may be used with this modification. Thermo switch 374, or the standard manually controlled switch which may be substituted, may be closed by depressing the accelerator pedal 358 to close a circuit energizing solenoid 476. Core 482 will then move piston 484 to compress spring 486 and cut off fluid pressure from inlet port 270 through annular port 498 to annular passage 268 of power piston 266. Port 488 will then connect port 490 with the interior of the control casing through exhaust port 492 by means of axially extending passage 494 in piston 484. When the thermo switch 374 is heated sufficiently, or the standard switch is opened, the circuit energizing solenoid 476 will be opened and spring 486 will return piston 484 to the position shown in FIGURE 9, allowing fluid under pressure to again be transmitted to annular passage 268. Thus, when the governor is temporarily overridden at the operator's demand, power piston 266 is moved to the right as shown in FIGURE 9 by exhausting chamber 278. When the power piston moves in this direction, its influence on the engine throttle control linkage is removed and the engine throttle may be operated independently of the road speed control system.

Figure 10:
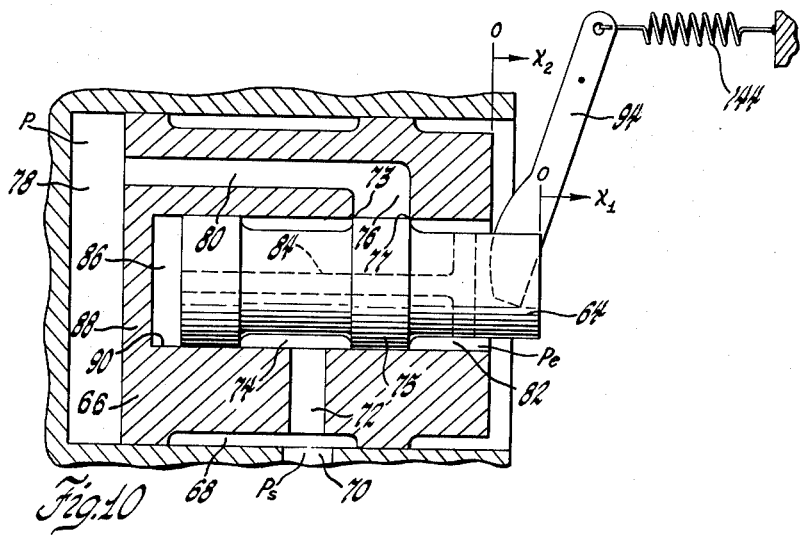
FIGURE 10 is a schematic sectional view of the servo and control valve similar to portions of FIGURES 3, 4 and 9.
Figure 11:
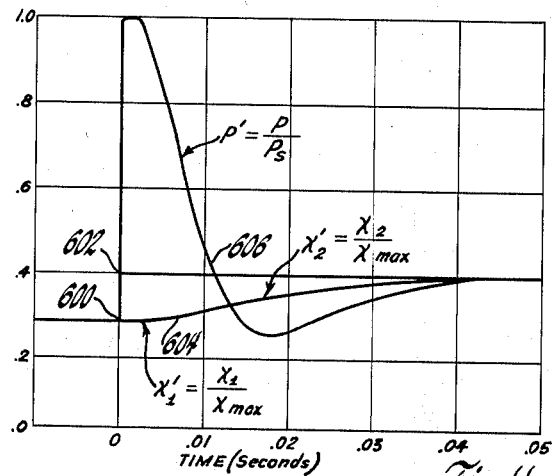
FIGURE 11 is a plot of pressure and other relationships obtained by a step input change in control valve movement of the structure of FIGURE 10.
Figure 12:
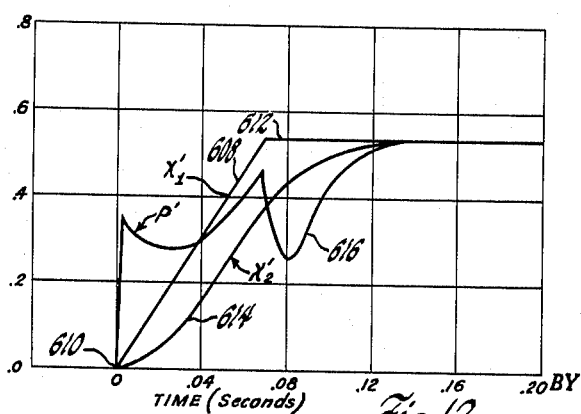
FIGURE 12 is a plot of pressure and other relationships obtained by a ramp input change in control valve movement of the structure of FIGURE 10.

Analysis of the action of the servo 66 under the control of valve 64 is shown in FIGURES 10, 11 and 12. This analysis is also applicable to the mechanisms of FIGURES 4 and 9. Valve 64 is responsive to the selected vehicle speed setting provided as a value of the force of spring 50 acting thereon and the force exerted by governor 22 through yoke 36 and arm 46. FIGURE 10 is similar to a portion of FIGURES 3, 4 and 9, with simplification, and has appropriate analysis symbols provided.

The input to the system is the position $X_1$ of valve 64. A change in $X_1$ represents the movement of that valve. The force required to produce the change in $X_1$ is very small. The system output is the position $X_2$ of the servo 66, which follows the input $X_1$ at a high force level. When $X_1$ is greater than $X_2$, the chamber 78 communicates with the supply pressure $P_s$ supplied through port 70, annular passage 68, radial passage 72, annular port 74, the orifice 73 defined by the valve land 75 controlling the connection of port 74 to radial passage 76, and passage 80. The area of orifice 73 is proportional to $X_1-X_2$. When $X_2$ is greater than $X_1$, the chamber 78 communicates with the exhaust pressure $P_e$ through orifice 77, the area of which is proportional to $X_2-X_1$. This is the orifice controlled by the valve land 75 which may connect passage 76 and exhaust port 82. Ideally, when $X_1=X_2$, the chamber 78 is isolated from both supply and exhaust pressures. As a practical matter, the "line-to-line" valve will communicate with both pressures in the vicinity of $X_1=X_2$, however.

When $X_1$ increases, $P_s$ supplies fluid pressure into the chamber 78 under control of orifice 73, increasing chamber pressure P and causing $X_2$ to follow. When $X_1$ decreases, chamber 78 is vented to $P_e$ through orifice 77, allowing the spring 144 to decrease $X_2$. $X_2$ will not oscillate about $X_1$ in the steady state as chamber pressure P is alternately switched between $P_s$ and $P_e$ since there is a pressure drop across the chamber orifice due to fluid flow. The chamber pressure P, therefore, is not a discontinuous variable having only two stable states $P_s$ and $P_e$. The chamber pressure P will assume some intermediate value between $P_s$ and $P_e$ required to overcome the force of spring 144. Furthermore, as spring 144 is extended or permitted to recover, the actual force required to be exerted by chamber pressure P on the piston 66 must vary to balance the changed spring force.

FIGURE 11 illustrates the transient responses of chamber pressure P and $X_2$ to step, or instantaneous, inputs of $X_1$, while FIGURE 12 illustrates the transient responses of chamber pressure P and $X_2$ to $X_1$ ramp inputs or gradual changes in $X_1$. The pressure P' plotted in these curves is $P/P_s$, $X_1'=X_1/X$ max., and $X_2'=X_2/X$ max. The scales used approximate a typical design. Assuming $X_1'$ moves instantaneously from the value of the line of position 600 to the value indicated by the line of position 602, pressure P' moves from a value which maintained $X_2'$ at position 600 to a new value which will maintain $X_2'$ at position 602. The illustrated change is a change in ratio value of $X_1'$ and $X_2'$ from approximately .3 to .4. Curve 604 illustrates the change in $X_2'$, while curve 606 illustrates the change in pressure P', plotted against time in seconds.

The response of $X_2$ resembles that of a heavily overdamped second order system. The chamber pressure P varies continuously but rapidly following the step input of $X_1$ until it reaches the pressure required to hold $X_2$ equal to $X_1$. The fluid capacitance and orifice combine to form a non-linear response time constant which is very small. As $X_2'$ begins to increase, following curve 604, fluid flow through orifice 73 increases and the area of orifice 73 then decreases. These factors combine to change chamber pressure P to the point where it begins to decelerate $X_2$. There is no overshoot obtained and stable operation is provided.

As the vehicle speed will change due to changes in road conditions requiring variable power demands to hold the speed constant, the governor 22 will act through the arm 46 to change $X_1$ relative to $X_2$, causing commensurate changes in chamber pressure P depending upon whether the actual vehicle speed is an increase or a decrease in relation to the selected speed. The speed error will, therefor, upset the balance of the forces acting on piston 66 and readjustment of the system by modulation in the manner above described will take place. It is obvious that in a vehicle wherein the speed is insipiently changing, modulation will continue in order to maintain $X_1=X_2$, or nearly so, at all times, to maintain the vehicle road speed at the selected speed.

When $X_1$ is a ramp-type input change, as illustrated by curve 608 of FIGURE 12 for $X_1'$, the responses of chamber pressure P and $X_2$ are as illustrated by the curves for P' and $X_2'$ in that figure. In this instance $X_1'$ is varied from the line of position 610 to the line of position 612 over a finite interval of time and $X_2'$ follows curve 614 but, of course, lags behind $X_1'$. $X_2'$ also follows from line of position 610 to line of position 612, however. The pressure P' follows curve 616 in this instance. Similarly, when $X_1$ is a ramp input reflecting speed error due to changes in vehicle speed as sensed by the governor 22, the pressure P' indicates the changes taking place in chamber pressure P in order to bring the system into balance once more. As $X_1$ may continuously vary, so may chamber pressure P, since it must have a value between the pressure limits of $P_s$ and $P_e$ which will exactly balance the spring 144. It can, therefore, be seen that the speed control system embodying the invention includes a servo which is responsive to a fluid pressure differential which is varied continually in relation to the speed error determined by the difference between the actual vehicle speed and the selected vehicle speed. The fluid pressure differential is, therefore, modulated in accordance with the speed error.

A road speed control system has been provided which permits control of maximum vehicle speed or provides a constant cruise control speed of a vehicle at a predetermined value while retaining full control by the operator should such control be necessary. The road speed control system may be immediately disconnected from control of the engine by moving the accelerator pedal to a beyond full throttle position or by pushing the brake pedal slightly. Either of these actions is instinctive and the natural action to be taken by an operator should he desire to accelerate beyond the control speed or to apply the vehicle brakes to diminish the vehicle speed to a point below the control speed.

What is claimed is:

1. A road speed control system for a vehicle comprising:
    throttle valve actuating linkage including a lost motion mechanism and having driver operated first input means and second input means and output means, an engine throttle valve connected to said output means and movable by the driver operated first input means throughout a throttle valve opening range to control vehicle speed;
    vehicle speed error sensing means including a vehicle speed reflecting member and a reference speed reflecting member;
    vehicle speed maintaining means effective only when the vehicle speed is within a speed range including the reference speed and the driver operated first input means is moved by the driver into a throttle valve openable position beyond the throttle valve opening resulting in attainment of the reference speed by the vehicle
    to maintain the vehicle at a substantially constant road speed under varying power demands as reflected by vehicle speed error,
    and including holding means for holding said driver operated first input means in said throttle valve openable position
    and first means operated by said vehicle speed error sensing means and generating a fluid pressure proportional to vehicle speed error,
    and second means responsive to the fluid pressure generated by said first means and acting through said throttle valve actuating linkage second input means to produce a force on said throttle valve varying directly with the fluid pressure applied to said fluid pressure responsive second means and moving the throttle valve through a throttle valve opening range.

2. The system of claim 1, said vehicle speed maintaining means first means including a source of fluid pressure and a vehicle speed error responsive control valve acting on the fluid pressure from said source and controlling the fluid pressure applied to said second means,
    said vehicle speed error sensing means including a governor as said vehicle speed reflecting member and a variable force exerting spring as said reference speed reflecting member,
    and a bellcrank receiving a vehicle speed signal from said governor and a reference speed signal from said spring and connected to said control valve to move said valve in proportion to vehicle speed error.

3. The system of claim 1, said vehicle speed maintaining means second means comprising a servo including a cylinder and a power piston reciprocably received therein and movable in response to the fluid pressure applied thereto and having a fluid pressure control passage formed therein and reciprocably receiving said speed error responsive control valve.

4. The system of claim 1, further comprising manually controlled power actuated means selectively overriding said vehicle speed maintaining means first means and operatively disconnecting said vehicle speed maintaining means second means from the throttle valve actuating linkage output means.

5. The system of claim 4, said manually controlled power actuated means including first selectively operated mechanism sensitive to application of the vehicle brakes and second selectively operated mechanism sensitive to vehicle driver movement of said throttle valve actuating linkage first input means to a position beyond the throttle opening determined by said vehicle speed maintaining means second means,
    said first and second members being independently actuatable to override said vehicle speed maintaining means first means.

6. In a vehicle driven by an internal combustion engine having a throttle,
    a vehicle road speed servo control for said throttle comprising
    a source of pressure,
    a cylinder connected with said source,
    a power piston received for reciprocation within said cylinder and having one end wall cooperating with one end of said cylinder to define a pressure chamber,
    a circumferentially extending piston passage formed in said piston and circumferentially closed by the side wall of said cylinder for receiving pressure from said source at any operable axial position of said piston,
    said piston having a valve chamber axially formed therein and reciprocably receiving a control valve in said chamber,
    said control valve and said valve chamber cooperating to define a circumferential valve passage and an exhaust passage,
    a first passage in said piston connecting said circumferential piston passage with said circumferential valve passage,
    second and third passages in flow series adapted to connect said pressure chamber to said circumferential valve passage or to said exhaust passage during unbalanced control conditions determined by the relative axial position of said valve to said piston,
    said piston and valve having a balanced control condition with said pressure chamber being closed,
    and means sensitive to vehicle road speed for positioning said control valve.

7. Power actuating means for a vehicle engine throttle, said power actuating means being sensitive to vehicle road speed and including
    a casing,
    a power piston reciprocably received within said casing, a power piston pilot control valve reciprocably received within said power piston, vehicle speed sensitive means operatively connected with said control valve to move said control piston axially relative to said power piston, manually controlled means for varying said vehicle road speed sensitive means whereby said control piston is actuatable at a preselected vehicle speed, said casing having a fluid pressure inlet connecting with said power piston, fluid passages in said power piston connecting said fluid pressure inlet with said control piston, said control piston being operable to direct said fluid pressure to one end of said power piston to move said power piston in follow-up relation to said control piston, and means independently operable by the operator of said vehicle for exhausting said power piston fluid pressure to disconnect said power piston from said vehicle throttle linkage.

References Cited by the Examiner

UNITED STATES PATENTS

| | | | |
|---|---|---|---|
| 2,036,619 | 4/36 | Brown et al. | |
| 2,157,472 | 5/39 | Bellis. | |
| 2,203,446 | 6/40 | Shearer | 137—49 |
| 2,486,369 | 10/49 | Goss | 180—82.1 X |
| 2,737,165 | 3/56 | Thorner | 123—103 |
| 2,835,237 | 5/58 | Thorner | 123—102 |
| 2,916,100 | 12/59 | Teetor | 180—82.1 |
| 2,966,224 | 12/60 | Teetor | 180—82.1 |

A. HARRY LEVY, *Primary Examiner.*

BENJAMIN HERSH, *Examiner.*